United States Patent [19]
Abbotts

[11] 3,709,037
[45] Jan. 9, 1973

[54] FLOWMETERS

[75] Inventor: William Edward Abbotts, Foxton, near Royston, England

[73] Assignee: B. Rhodes & Son Limited

[22] Filed: Oct. 23, 1970

[21] Appl. No.: 83,304

[30] Foreign Application Priority Data

Oct. 23, 1969 Great Britain.....................52,025/69
April 28, 1970 Great Britain.....................20,347/70

[52] U.S. Cl........................................73/231, 73/209
[51] Int. Cl...............................................G01f 1/10
[58] Field of Search................73/210, 209, 230, 231

[56] References Cited

UNITED STATES PATENTS

| 3,251,227 | 5/1966 | Ichihara et al. | 73/209 |
| 3,292,433 | 12/1966 | Ichihara | 73/209 |
| 1,016,934 | 2/1912 | Charlton | 73/231 |
| 2,052,794 | 9/1936 | Petot | 73/230 |

FOREIGN PATENTS OR APPLICATIONS

| 1,498,433 | 4/1969 | Germany | 73/230 |
| 137,679 | 5/1961 | U.S.S.R. | 73/231 |

Primary Examiner—James J. Gill
Attorney—Larson, Taylor & Hinds

[57] ABSTRACT

A flowmeter is comprised of a housing with a cavity through which fluid may flow. A rotor is disposed in the cavity, is wholly supported by fluid when it flows through the cavity and is rotated by interaction with the fluid flowing through the cavity.

8 Claims, 11 Drawing Figures

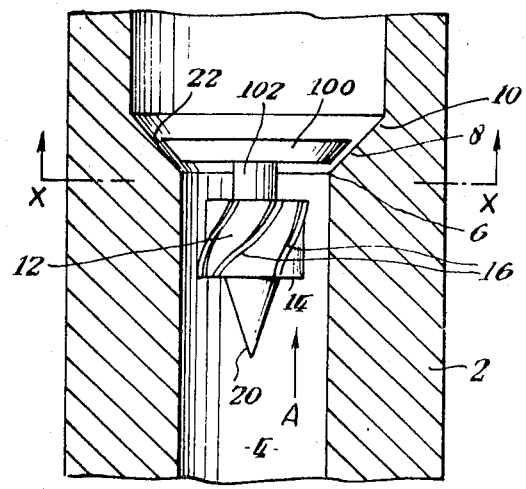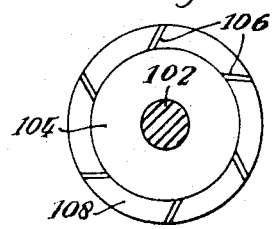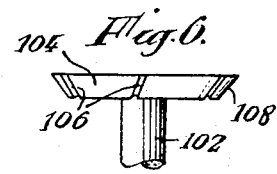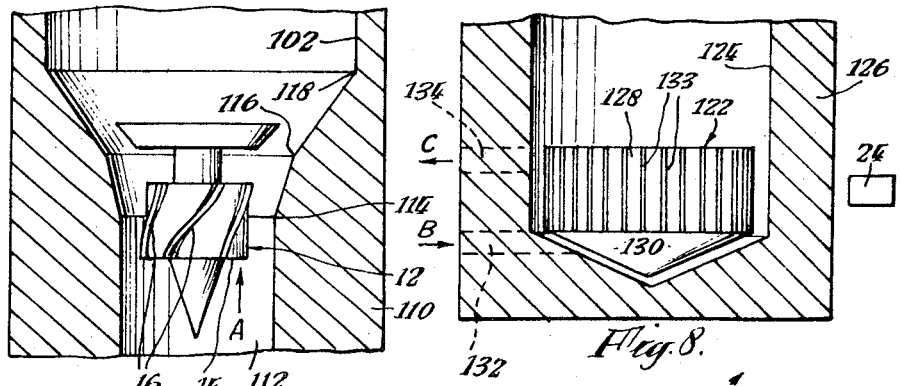

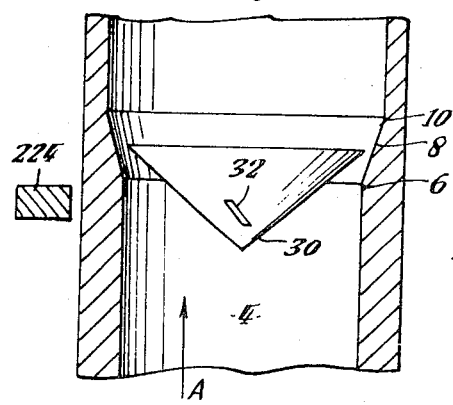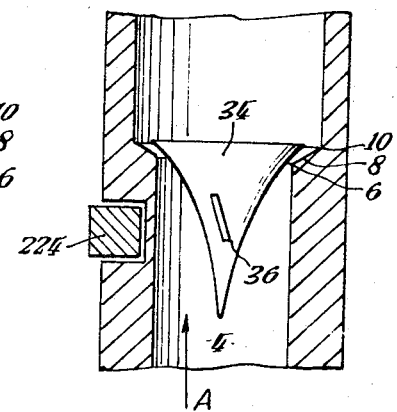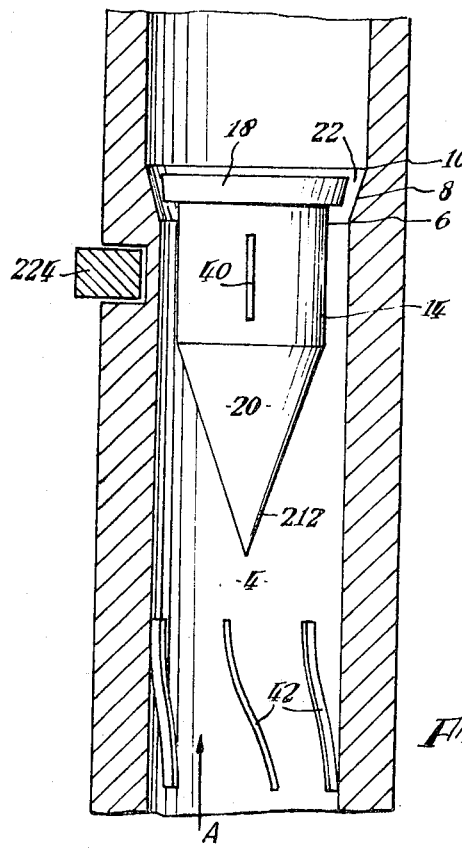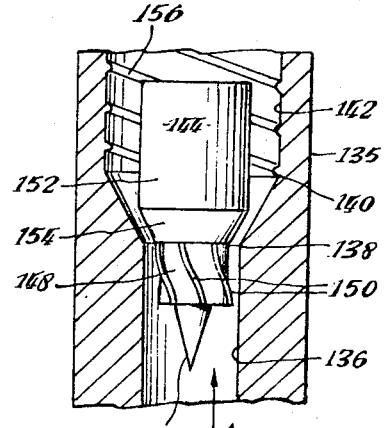

FLOWMETERS

This invention relates to flowmeters and has for its object to provide improvements therein.

According to the invention, a flowmeter for measuring the rate of flow of a fluid comprises a housing having a substantially vertical passage formed with at least a cylindrical section and a divergent section through which fluid may be caused to flow upwardly. A rotor is located in the passage for interaction with and support by fluid flowing upwardly through the passage, which rotor comprises a conically-shaped fairing pointing axially upstream immediately upstream of an axial flow turbine part which is positioned to run at least in part within the cylindrical section of the housing. The fairing defines with the walls of the passage a convergent passage to the axial flow turbine part. The fairing and turbine parts are integral and coaxial with a tail part which is downstream from the turbine part and rotatable within the divergent section of the passage, the maximum diameter of the tail part being greater than the diameter of the cylindrical section. Preferably the tail part has a substantially frusto-conical surface against which the upwardly flowing fluid impinges. The turbine part may be provided with a plurality of substantially helical vanes, or the turbine part may be provided with a plurality of axial vanes and there may be provided upstream of the rotor a plurality of fixed helical vanes. The passage may include a substantially cylindrical lower portion and upper portion whose diameter is larger than that of the lower portion, and a divergent portion between and linking the upper and lower portions. Optical or magnetic means may conveniently be used for detecting rotation of the rotor.

In order that the invention may be clearly understood and readily carried into effect, some preferred embodiments thereof will now be described, by way of example only, with reference to the accompanying diagrammatic drawings, wherein:

FIGS. 1 to 4 each represent vertical sections through parts of different forms of flowmeters in accordance with the invention, FIG. 5 shows an underneath view of the top part of a modified rotor (similar to the rotor of FIG. 1) corresponding to a cross section on the line X—X of FIG. 1, FIG. 6 is a side view of the top part of the rotor of FIG. 5, FIG. 7 shows a further modified form of flowmeter, FIG. 8 shows a vertical cross section through yet another form of flowmeter in accordance with the invention, FIGS. 9 and 10 show alternative horizontal cross sections through the flowmeter of FIG. 8 and, FIG. 11 shows a vertical cross section of another flowmeter in accordance with the invention.

In the drawings, like parts bear like reference numerals.

Referring first to FIG. 1 the flowmeter includes a cylindrical housing 2 having a passageway 4 which in circular in cross section over at least the portion shown. In use the fluid whose rate of flow is to be measured is caused to flow upwards through the passageway 4 in the direction of the arrow A. Above a point indicated 6 the walls of the passageway 4 diverge so as to form a region of divergence 8, terminating at a point 10 above which the passageway is cylindrical. Below the point 6 the passageway 4 is also cylindrical.

In the passageway 4 there is a rotor 12 which is symmetrical about a vertical axis and is arranged in a nose down attitude. The rotor 12 has a cylindrical body portion 14 on which are mounted a number of helical vanes 16, all with the same inclination and disposed symmetrically about the axis of the rotor 12. In the embodiment of FIG. 1 there are six blades 16. The vanes 16 project from the cylindrical body portion 14 a distance such that they sweep closely the walls of the passageway 4. Above the cylindrical part 14 the rotor has a frusto-conical tail part 100 on a stem 102. Below the cylindrical part 14 the rotor has a conical nose or fairing 20. In the embodiment illustrated the cone has an included angle at its apex of 40° (i.e. the generator line of the cone makes an angle of 20° with the axis of the cone). The walls of the region of divergence 8 comprise the surface of a frustum of a cone having an included angle at its apex of 80°, whereas the tail part 100 is a frustum of a cone having an included angle at its apex of 90°.

When the rotor 12 is at rest and no fluid is flowing, the rotor rests with its tail part 100 in the diverging region 8. When fluid commences to flow in the direction of the arrow A the rotor lifts slightly to allow the fluid to flow through an annular gap 22 thereby formed between the rotor and walls of the passageway, until the rotor is wholly supported by the moving fluid, whether liquid or gaseous. The moving fluid impinges on the vanes 16 thus applying a torque to the rotor about a vertical axis, this torque varying with the speed of the fluid and being balanced by the frictional forces. Hence the rate of rotation of the rotor depends on the rate of flow of the fluid through the passageway. As the rate of flow increases so the rotor lifts, thereby increasing the size of the annular gap 22. Because of the region of divergence 8, a small lift of the rotor 12 produces a relatively large increase in the area of cross section of the annular gap 22. Thus over the useful working range of the flowmeter the rotor remains at a substantially constant position in the passageway. Under steady state conditions the weight of the rotor is exactly counteracted by the upthrust of the displaced fluid plus the upthrust due to fluid flow.

It will be appreciated that the correct design of the rotor is an important feature of the invention. For satisfactory working it is believed (and it is not intended that the truth or otherwise of this explanation should affect the validity of the invention in any way) that, over the useful working range of the flowmeter of FIG. 1, the center of gravity of the rotor should always lie below the center of upthrust (i.e. the point at which the resultant of the upthrusting forces exerted on the rotor can be considered to act), and that the plane in which the resultant torque exerted by the moving fluid on the vanes acts should lie between the center of upthrust and the center of gravity of the rotor.

Reference numeral 24 denotes diagrammatically an optical detector for detecting the rotation of the rotor and measuring the rate of rotation thereof. This is arranged to detect light from a light source 25. The surface of the tail part 100 is painted so as to have a striated zone in which there are alternate black and white stripes, the beam of light from light source 25 being reflected from the striated zone to the detector 24 as the rotor rotates. The rate of rotation of the rotor depends on the rate of flow of fluid up the passageway 4 and hence, by measuring the readout from the detector 24, an estimate of the rate of fluid flow can be obtained. Conveniently, the rotor 12 is made from a metal such as aluminum or from an organic thermoplastic polymeric material. Instead of having a striated zone the rotor may have a diametral hole through it, the light source and detector being arranged at opposite ends of a diameter in this arrangement. Alternatively the rotor may have a projection or projections arranged to interrupt the light beam.

Alternatively, the rotation of the rotor may be sensed electromagnetically. The rotor may be magnetically coupled to a rotatable body external to the passageway 4 or have an external escapement or a reed switch coupled to it magnetically. Again the rotor may have transparent or translucent areas and the transmittance of the rotating rotor may be measured photometrically.

If desired fixed vanes (not shown) parallel to the axis of the passageway 4 may be provided on the walls of the passage upstream of the rotor (i.e. below the rotor as shown in FIG. 1).

In my preliminary experiments with water I found that I could get reproducible results to + or − 5 percent accuracy or better using a flowmeter with an 18:8 stainless steel rotor similar to that illustrated in FIG. 1 for flow rates between about 600 cc/minute and about 3600 cc/minute. The housing had a vertical passage of 0.54 inch diameter widening to 0.75 inch diameter with a region of divergence whose walls are the frustum of a cone with an included angle at its apex of 80°. The rotor had an overall length of 0.96 inch and a maximum diameter of 0.63 inch. The diameter of the rotor at the roots of the vanes was 0.20 inch and at the tips of the vanes 0.46 inch.

FIGS. 2 and 3 show forms of flowmeters similar to that of FIG. 1 but with different shaped rotors. The rotor 30 of FIG. 2 is conical and bears a number of vanes 32. The rotor 34 of FIG. 3 is cusp-shaped and has vanes 36. In FIGS. 2 and 3 reference numeral 224 denotes diagrammatically a detector for detecting the rotation of the rotor and measuring the rate of rotation thereof. In the embodiment illustrated the vanes 40 are of magnetic material and the detector 224 is a magnetically polarized coil, the signal from which is monitored in a conventional way, (not shown) e.g. by connection to a galvanometer for visual read-out or to a moving pen recorder from which a direct reading of the rate of flow may be obtained after calibration of the flowmeter. Again it will be apparent to those skilled in the art that an integrated read-out may readily be obtained from the detector 224 by conventional means.

If the fluid is transparent or translucent and the housing 2 is made, for example, of glass, photometric methods may be used to measure the rate of rotation of the rotor. In this case the rotor may be marked, for example, with a number of dark vertical stripes. Reference numeral 224 is this case would represent a lamp for illuminating the rotor surface and a photometer from which a direct reading of flow rate or an integrated read-out can be obtained in a conventional way.

FIG. 4 shows a modified form of flowmeter, in which the body portion 14 of the rotor 212 has vanes 40 which are parallel to its axis. Also, upstream of the rotor 212, a number of fixed helical guide vanes 42 are provided in the walls of the passageway 4. These impart a swirling movement to the moving fluid as it passes up the passageway in the direction of the arrow A. The swirling fluid impinges on the vanes 40 and causes the rotor to rotate. The faster the fluid is moving up the passageway the faster the swirling movement and the faster the rotor rotates.

In FIGS. 5 and 6 the rotor has a tail part 104 which is provided with a number of inclined grooves 106 in the frusto-conical surface 108. Such a rotor can be used in conjunction with the housing 2 of FIG. 1 and a light source and detector to form a flowmeter in accordance with the invention. Since the grooves 106 are inclined at an angle to the axial plane they tend to cause rotation of the rotor 100 when fluid flows upwards through the flowmeter. The hand of the grooves may be the same as the hand of the vanes on the rotor or may be different from it. Depending on the groove area and inclination to the axial plane they will tend to cause an increase or decrease in the rate of rotating of this rotor (compared with the rate of rotation of a similar rotor without the grooves 106 at the same rate of fluid flow).

FIG. 7 shows a modified form of flowmeter having a housing 110 in which is positioned a rotor of the same general shape as the rotor 12 and of corresponding size. The direction of flow of the fluid of the flowmeter of FIG. 7 is shown by the arrow A. In the housing 110 there is a vertical passage 112 and there is a first region of divergence with conical walls between the points indicated 114 and 116. There is a second region of divergence (again with conical walls) between the points 116 and 118. Above the point 118 the passageway is again cylindrical as shown by the reference number 120. At low fluid flow rates the body portion 14 of the rotor 12 will be disposed in the cylindrical passageway 112, but when the fluid flow rate passes a critical value the rotor will lift until the body portion of the rotor 12 with its vanes 16 lies in the first region of divergence between the points 114 and 116. Because of the change of diameter in the ambience of the body portion, the number of revolutions of the rotor per unit volume of fluid is different in these two conditions. In general when the body portion 14 is in the first region of divergence (i.e. at high flow rates) the number of revolutions per unit volume is lower than when the body portion 14 is disposed in the cylindrical passageway 112.

If the opposite effect is desired, i.e. if a reduction in the number of revolutions of the rotor per unit volume of fluid at low flow rates is desired, the first region of divergence between the points 114 and 116 may be replaced by a region of convergence. In this case the diameter of the passage would be larger at the point 114 than at the point 116.

In the flow meter of FIG. 8 a rotor 122 is disposed in a nose-down attitude in a chamber 124 in a housing 126. The rotor 122 has a cylindrical upper portion 128 and a conical nose 130, the chamber 124 having a correspondingly shaped conical lower portion. Fluid may enter the chamber 124 in the direction of the arrow B of FIG. 8 through one of a number of passages 132 which are symmetrically disposed with respect to the walls of the chamber 124 and deliver fluid tangentially thereto. In the form illustrated in FIG. 9 there are four symmetrically disposed passageways 132 whereas the housing of FIG. 10 has only three. The cylindrical upper portion 128 of the rotor 122 is provided with a number of vertical fins 133 which are equally spaced around the circumference of the cylindrical portion 128. In the flowmeter of FIG. 8 to FIG. 10 the fins 133 are placed at the maximum rotor diameter and thus a relatively large torque is exerted on the rotor. HIgh viscosity liquids may give particularly satisfactory results with this form of flowmeter since there is very little shear force in the fluid at any region near the rotor. If desired the rotor 128 can be hollowed out. As before reference numeral 24 represents a detector. Passages 134 may be provided to permit fluid to leave the flowmeter in the direction of the arrow C, such passages 134 being inclined to a diametrical plane but in the opposite sense to the passages 132. If desired the upper end of the rotor 122 can be provided with a tail part similar to the tail part of the rotor of FIG. 1 or of FIGS. 5 and 6. In this case the passage 124 would be formed with an appropriately sized region of divergence.

In the flowmeter of FIG. 11 the housing 135 is provided with a vertical cylindrical passageway 136. At the top of this passageway there is a region of divergence from the point 138 to the point 140 over which the walls are frusto-conical. Above the point 140 the passageway is again cylindrical as shown at 142. A rotor 144 is disposed in nose-down attitude in the passageway 136. This has a conical nose portion or fairing 146 and a cylindrical body 148 with a number of helical vanes 150 symmetrically disposed about its axis. Above this is a cylindrical tail part 152, there being a frusto-conical portion 154 between the cylindrical part 148 and the cylindrical part 152. The interior of the passageway 142 is provided with a number of inclined helical vanes 156 which are symmetrically disposed about the axis of the passageway and impart a swirling motion to the fluid as it passes up the passageway in the direction of the arrow A. The operation of the flowmeter is essentially the same as the operation of FIG. 1, but in addition the twisting movement of the fluid imparted to it by the vanes 156 tends to exert further torque on the cylindrical part 152 through viscous drag thereon. The viscous drag exerted by the rotating fluid on the cylindrical part 152 tends to increase with viscosity, thus compensating for viscous drag around the lower region of the rotor.

In all forms of the meter described in this specification a mechanical revolution counter may be incorporated. This may use a magnetic coupling in a number of ways. It may also use a mechanism driven by a lightweight lever that is struck for example once a revolution by a projection on the rotor. This permits the rotor to accumulate energy and to stabilize its motion during the periods between succeeding actuations of the lever. The lever and subsequent counting mechanism is arranged to have the lowest possible friction, preferably by using a sealed chamber enclosing all parts. This chamber may be filled with fluid to protect and lubricate all parts. This arrangement using intermittent actuation of a lightweight lever permits lower flow rates to be measured than is possible with a system in which the revolution counter is continuously driven. In this arrangement a support is provided for the nose of the rotor which it is at rest, the support and the nose of the rotor being so shaped that, when fluid starts to flow through the flowmeter at a low rate, the rotor has to perform almost a complete revolution before it strikes the lever. Thus the rotor has the maximum possible time to pick up speed when starting from rest.

What is claimed is:

1. A flowmeter for measuring the rate of flow of a fluid comprising a housing having a substantially vertical passage formed with at least a cylindrical section and a divergent section through which said fluid may be caused to flow upwardly, and a rotor in said passage for interaction with and support by fluid flowing upwardly through said passage, which rotor comprises a conically-shaped fairing pointing axially upstream immediately upstream of, and defining with the walls of said passage a convergent passage to, an axial flow turbine part which is positioned to run at least in part within said cylindrical section of said passage, said fairing and turbine parts being integral and coaxial with a tail part which is downstream from said turbine part and rotatable within said divergent section of said passage, the maximum diameter of said tail part being greater than the diameter of said cylindrical section.

2. A flowmeter according to claim 1, wherein said tail part has a substantially frusto-conical surface against which the upwardly flowing fluid impinges.

3. A flowmeter according to claim 1, wherein said turbine part is provided with a plurality of substantially helical vanes.

4. A flowmeter according to claim 1, wherein said turbine part is provided with a plurality of axial vanes and wherein there are provided upstream of said rotor a plurality of fixed helical vanes.

5. A flowmeter for measuring the rate of flow of a fluid comprising a housing having a chamber therein of circular cross-section, the axis of which is disposed substantially vertically and through which fluid can be passed upwardly, said chamber including a substantially cylindrical lower chamber portion, an upper chamber portion whose diameter is larger than that of said lower chamber portion and a divergent portion between and linking said lower and upper chamber portions, a rotor in said chamber for interaction with and support by fluid passing upwardly through said chamber, and means for detecting the rate of rotation of said rotor, said rotor having a substantially conical downwardly pointing fairing, a plurality of vanes for interaction with said fluid and a tail part, said vanes being between said fairing and said tail part and the maximum diameter of said tail part being greater than the diameter of said lower chamber portion, whereby, when fluid is passed upwardly through said chamber, said rotor is supported by the moving fluid and is rotated by interaction of the moving fluid with said vanes at a rate in dependence on the rate of fluid flow, said vanes being arranged to run at least in part within said lower chamber portion.

6. A flowmeter according to claim 5, wherein said tail part includes a substantially frusto-conical surface against which said upwardly flowing fluid impinges.

7. A flowmeter according to claim 5, wherein said vanes are substantially helical.

8. A flowmeter according to claim 5, wherein said vanes are axial and where there are further provided a plurality of fixed substantially helical vanes in said lower chamber portion upstream of said rotor.

* * * * *